Patented Feb. 10, 1925.

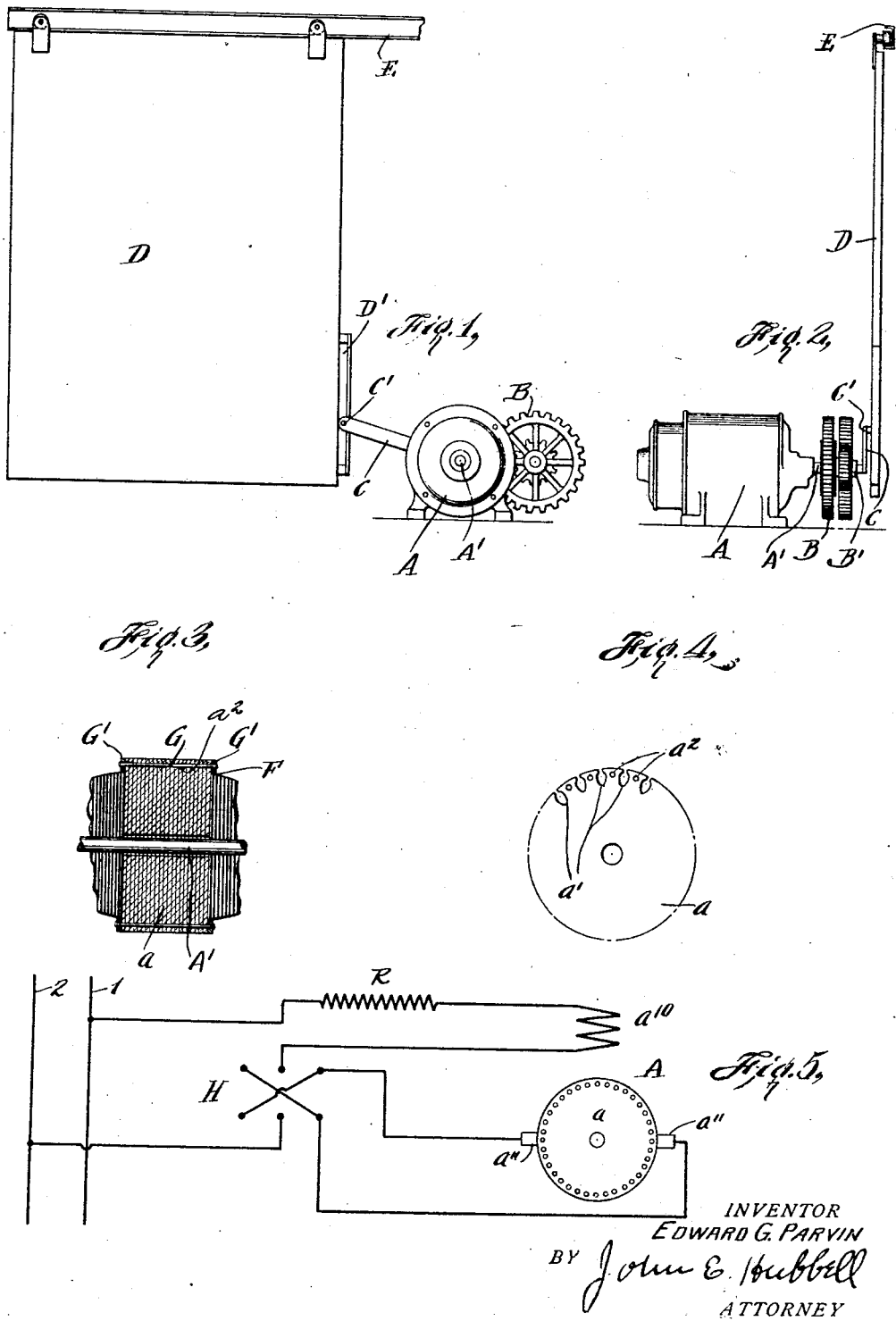

1,526,083

UNITED STATES PATENT OFFICE.

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK.

MOTOR SYSTEM.

Application filed February 17, 1923. Serial No. 619,574.

*To all whom it may concern:*

Be it known that I, EDWARD G. PARVIN, a citizen of the United States, and resident of Roselle, in the county of Union and State of New Jersey, have invented certain new and useful Improvements in Motor Systems, of which the following is a specification.

My present invention was primarily devised, and is especially adapted for use in opening and closing the doors of passenger cars operating under the conditions prevailing in subway, elevated and urban rapid transit systems, and one primary object of the invention is to provide an improved electric motor for supplying the necessary door moving thrust.

A more general object of the invention is to provide an electric motor capable of exerting its maximum torque at starting, and whenever it stalls, with simple and effective provisions for limiting the motor speed when the resistance to the motor movement is substantially less than the maximum motor torque. This result is accomplished in accordance with the present invention, by adding to the armature of an ordinary direct current motor, an induction motor rotor winding which in practice may well be of the simple squirrel cage type. My improved motor is not limited to use as a door actuating device but may be employed for other purposes.

The various features of novelty which characterize my invention are pointed out with particularity in the claims annexed to and forming a part of this specification. For a better understanding of the invention, however, and its advantages, reference should be had to the accompanying drawings and descriptive matter in which I have illustrated preferred embodiments of my invention.

Of the drawings:

Fig. 1 is a somewhat diagrammatic elevation of a car door and its operating motor;

Fig. 2 is an elevation taken at right angles to Fig. 1;

Fig. 3 is a partial sectional elevation of the motor armature;

Fig. 4 is a diagrammatic end elevation of the armature core; and

Fig. 5 is a diagram of the motor circuits.

In the drawings, I have illustrated the use of my invention in connection with a car door D, suspended from a supporting rail E. The door D is moved back and forth along the rail E between its open and closed positions, by means of a lever or crank arm C operated by an electric motor A. As shown, the arm C is not directly connected to the shaft A' of the motor A, though it might be so connected, but is connected to a shaft B' driven through speed reducing gears B from the motor shaft A'. The arm C is provided at its free end with a stud C' working in a vertical guideway or slot D' provided on the door D.

In Fig. 1, the door D is shown in its closed position, and is moved to its open position by a rotation of the shaft B' in the clockwise direction of approximately 180°, and is returned to its closed position by a reverse angular movement of the shaft B'. The motor A is a series wound direct current motor of ordinary type, except that the motor armature is not only provided with an ordinary direct current winding, of which the end connections are indicated at F, but is also provided with a winding such as is provided on the rotor of an induction motor. This winding may well be, and as shown, is of the squirrel cage type comprising conductors G connected by the usual end rings G'. In the particular arrangement shown in Figs. 3 and 4, the armature core $a$ is formed with slots $a'$ to receive the direct current armature conductors, and is formed with channels $a^2$ to receive the squirrel cage inductors G, but the direct current windings and the inductors G may obviously be placed in the same slots, or may be otherwise disposed in or on the armature core in any of the usual ways in which these windings are respectively disposed on the rotating cores to which they pertain.

In the motor energizing circuit arrangement illustrated diagrammatically in Fig. 5, 1 and 2 represent the supply conductors, and H represents a two pole double throw or reversing switch by which the direction of current flow through the direct current winding armature may be reversed, without reversing the direction of current flow through the field winding $a^{10}$. Ordinarily, and advantageously, a resistance R will be placed in series with the motor between the supply conductors 1 and 2.

In the intended operation of the apparatus shown in the drawings, the motor is operated to move the door D away from its open to its closed position by throwing the switch H into the corresponding one of its two operative positions, and the return movement of the door is effected by shifting the switch H into the other of its operative positions. Those skilled in the art will understand that limit switches or other automatic provisions may be provided to wholly or partially de-energize the motor when the door reaches either limit of its position, but I have not thought it necessary to illustrate or describe any such provisions as they form no part of the present invention, and those skilled in the art will readily understand how to make such provisions when wanted.

With the described arrangement in which the arm C turns through 180° to move the door from one limit of its movement to the other, the arm C forms a lock to prevent the door from being moved away from either its open or its closed position by force directly applied to the door. Also with a uniform angular velocity of the arm C, the door velocity will increase and diminish respectively, as the door approaches and moves away from its center position. While the leverage with which the crank arm C acts on the door diminishes as the door moves from either limit of its movement into its mid position, this is substantially compensated for by the fact that the frictional resistance to be overcome diminishes as the arm C moves away from either limit of its movement.

Unless the movement of a door operated in the manner described, is interfered with by passengers in the doorway or in some analogous manner, the force required to move the door will be at a maximum as the door is started away from either limit of its movement, and when the inertia and frictional starting resistance is once overcome and the door is started into movement, the force required to keep the door in motion will diminish to a very small amount. In consequence the motor if provided only with the ordinary series winding would tend to speed up and give the door a dangerously rapid movement. This would result in undesirable shock or jar when the door reached either limit of its movement, and in the case of the door closing movement would entail a serious risk of bodily injury to passengers having their bodies or limbs in the doorway. When the motor armature is provided with an inductive winding in accordance with the present invention, however, the reactance between the motor field and the current flow induced through the squirrel cage winding will put a drag or load on the motor armature which will increase as the armature speed increases. In consequence the maximum speed of the motor will be limited to that at which the load on the motor armature due to the drag of the squirrel cage armature, the frictional resistance to the motor rotation and the force with which the door opposes the armature movement, equals the motor torque then developed by the reaction between the motor field and the current flow through the direct current winding of the motor.

When the door movement is impeded by the engagement of the door with the bodies or limbs of passengers in the doorway and the movements of door and motor is consequently slowed down, the effective door actuating motor torque correspondingly increases, and becomes equal to the maximum torque of the motor when the movement of the door is arrested, no matter at what point in the door movement this may occur. With the crank and slot connection between the door and shaft B′, the door may actually tend to accelerate the armature velocity as the door approaches either limit of its movement, but only a comparatively trifling increase in motor speed is required to increase the drag of the squirrel cage winding sufficiently to overcome the momentum of the door and check its velocity at the desired rate. In practice, the motor and motor windings should be proportioned and designed to limit the door speed to the maximum considered safe or desirable, and to properly limit the maximum force with which the door can engage the person of a passenger in the doorway as the door is being closed.

Motors required for door actuation are relatively small in size, and are in operation only a small part of the time. In consequence the efficiency of such a motor is relatively unimportant, and the armature resistance need not be particularly high, as sufficient external resistance may well be employed to prevent an undue current flow through the motor windings when the motor is stalled while connected to the supply conductors, between which a potential difference exists which is materially higher than need be impressed on the motor to enable it to develop the maximum torque desired. The inductive squirrel cage or other shunt winding on the armature of a series wound direct current motor is equally applicable to a door operating motor in which the arm C is directly connected to the armature shaft, and the latter, in consequence, makes only half a turn to move the door from one limit to the other, though in such case, of course, the motor must be of larger size and its maximum speed must be lower, than when the motor is connected to the door by a speed reducing gear as illustrated in Figs. 1 and 2. Regardless of whether the motor shaft makes a plurality of turns or only part of a single turn to move the door from one position to another, it will be obvious that in lieu of the crank arm and slotted guideway connection between the door and the motor other known and suitable forms of mechanical connections for the same or analogous purposes may be employed. It will be obvious to those skilled in the art that the improved motor disclosed herein is not restricted to use as a door actuating motor but is well adapted for many other uses in which it is desired to maintain the same general relation between motor speed and motor torque delivered.

The invention is not necessarily restricted to use with a series wound motor, but may advantageously be used with other direct current motors of such character that the motor speed varies inversely with the motor load over a substantial range, such as a compound wound motor, or a motor in which the field winding is connected in shunt to the armature and to a resistance in series with the armature winding.

While in accordance with the provisions of the statutes, I have illustrated and described the best forms of my invention now known to me, those skilled in the art will readily understand that many changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. The combination with the field magnet and armature cores and windings of a direct current motor, and means for energizing said windings with direct current, of a permanently closed winding on the armature, exerting a retarding torque on the latter which increases with the armature speed.

2. The combination with the field magnet and armature cores windings of a direct current motor and means for energizing said windings with direct current, of a squirrel cage armature winding for restricting the armature speed without minimizing the armature torque at low armature speeds.

3. The combination with the field magnet and armature cores and windings of a series wound direct current motor and means for energizing said windings with direct current, of a permanently closed winding on the armature, exerting a retarding torque on the latter which increases with the armature speed.

4. Means for moving a door back and forth between open and closed positions, comprising a direct current motor and means for energizing it with direct current, said motor having its armature provided with a permanently short circuited winding exerting a retarding torque on the latter which increases with the armature speed, and a mechanical door actuating connection to the motor armature adapted to impart a reciprocating movement to the door when the armature is rotated.

5. Means for moving a door back and forth between open and closed positions, comprising a direct current motor and means for energizing it with direct current, said motor having its armature provided with a permanently short circuited winding exerting a retarding torque on the latter which increases with the armature speed, and a door operating connection to motor armature, including a crank rotated by the armature and adapted when turned through an angle of approximately 180° to move a door from one limit of its movement to the other.

Signed at Garwood in the county of Union and State of New Jersey this 14th day of February A. D. 1923.

EDWARD G. PARVIN.